(12) United States Patent
Greiner et al.

(10) Patent No.: US 10,235,138 B2
(45) Date of Patent: Mar. 19, 2019

(54) INSTRUCTION TO PROVIDE TRUE RANDOM NUMBERS

(71) Applicant: INTERNATIONAL BUSINESS MACHINES CORPORATION, Armonk, NY (US)

(72) Inventors: Dan F. Greiner, San Jose, CA (US); Bernd Nerz, Boeblingen (DE); Timothy J. Slegel, Staatsburg, NY (US); Tamas Visegrady, Zurich (CH); Christian Zoellin, Weinstadt (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/281,159

(22) Filed: Sep. 30, 2016

(65) Prior Publication Data
US 2018/0095729 A1   Apr. 5, 2018

(51) Int. Cl.
*G06F 7/58* (2006.01)

(52) U.S. Cl.
CPC .......... *G06F 7/588* (2013.01); *G06F 2207/58* (2013.01)

(58) Field of Classification Search
None
See application file for complete search history.

(56) References Cited

U.S. PATENT DOCUMENTS

| 7,890,561 | B2 | 2/2011 | Boerstler et al. |
| 8,131,789 | B2 | 3/2012 | Vergnes et al. |
| 8,489,660 | B2 | 7/2013 | Herbert et al. |
| 8,595,277 | B2 | 11/2013 | Goettfert et al. |
| 8,879,733 | B2 | 11/2014 | Goettfert et al. |
| 9,052,975 | B2 | 6/2015 | Fukushima et al. |
| 9,201,629 | B2 | 12/2015 | Greiner et al. |
| 9,304,740 | B2 | 4/2016 | Barakat et al. |
| 9,311,051 | B2 | 4/2016 | Kaplan et al. |
| 9,383,969 | B2 | 7/2016 | Van Der Sluis et al. |
| 9,544,139 | B2 * | 1/2017 | Cox ...................... H04L 9/0662 |

(Continued)

OTHER PUBLICATIONS

Barker et al., "Recommendation for Random Number Generation Using Deterministic Random Bit Generators," National Institute of Standards and Technology (NIST), NIST Special Publication 800-90A, Jan. 2012, pp. 1-137.

(Continued)

*Primary Examiner* — David H Malzahn
(74) *Attorney, Agent, or Firm* — Steven Chiu, Esq.; Blanche E. Schiller, Esq.; Heslin Rothenberg Farley & Mesiti P.C.

(57) ABSTRACT

An instruction configured to perform a plurality of functions is executed. Based on a function code associated with the instruction having a selected value, one or more inputs of the instruction are checked to determine which one or more functions of the plurality of functions are to be performed. Based on a first input of the one or more inputs having a first value, a function of providing raw entropy is performed, in which the providing of raw entropy includes storing a number of raw random numbers. Further, based on a second input of the one or more inputs having a second value, a function of providing conditioned entropy is provided, in which the providing of conditioned entropy includes storing a number of conditioned random numbers.

20 Claims, 9 Drawing Sheets

(56) References Cited

U.S. PATENT DOCUMENTS

| | | |
|---|---|---|
| 2005/0055391 A1 | 3/2005 | Carlson et al. |
| 2010/0332574 A1* | 12/2010 | Herbert .................. G06F 7/588 708/251 |
| 2014/0025718 A1 | 1/2014 | Chen |
| 2014/0040338 A1* | 2/2014 | Van Der Sluis ........ G06F 7/588 708/254 |
| 2014/0108478 A1 | 4/2014 | Lee et al. |
| 2014/0195576 A1* | 7/2014 | Kaplan .................. G06F 7/588 708/250 |
| 2014/0270162 A1 | 9/2014 | Greiner |
| 2014/0280411 A1 | 9/2014 | Rose |
| 2014/0372767 A1 | 12/2014 | Green et al. |
| 2015/0055778 A1 | 2/2015 | Cox et al. |
| 2015/0106415 A1 | 4/2015 | Mei et al. |
| 2018/0095729 A1* | 4/2018 | Greiner .................. G06F 7/588 |

OTHER PUBLICATIONS

"Secure Hash Standard (SHS)," Federal Information Processing Standards Publication, FIPS PUB 180-4, National Institute of Standards and Technology, Gaithersburg, MD, Mar. 2012, pp. 1-37.

Turan et al., "DRAFT Special Publication 800-90B, Recommendation for the Entropy Sources Used for Random Bit Generation", National Institute of Standards and Technology (NIST), Jan. 2016, pp. 1-75.

IBM, "z/Architecture—Principles of Operation," IBM Publication No. SA22-7832-10, Eleventh Edition, Mar. 2015, pp. 1-1732.

IBM, "Power ISA—V2.07B," Apr. 2015, pp. 1-1527.

International Search Report and Written Opinion for PCT/EP2017/074329 dated Dec. 22, 2017, pp. 1-14.

Thomas, David B. et al., "A Comparison of CPUs, GPUs, FPGSs, and Massively Parallel Processor Arrays for Random Number Generation," Field Programmable Gate Arrays, ACM, XP058287908, Feb. 2009, pp. 63-72.

* cited by examiner

INSTRUCTION TO PROVIDE TRUE RANDOM NUMBERS

BACKGROUND

One or more aspects relate, in general, to processing within a computing environment, and in particular, to processing associated with generating true random numbers.

Computer applications use random numbers for a variety of functions, including the generation of data encryption keys, simulation of complex phenomena, selecting samples from larger data sets, gaming, etc. To generate a random number, a random number generator (RNG) is used. A random number generator is a computational or physical device designed to generate a sequence of numbers or symbols that cannot be reasonably predicted better than by a random chance. Random numbers may be pseudorandom numbers or true random numbers.

Pseudorandom numbers are generated using a pseudorandom number generator (PRNG), also known as a deterministic random bit generator (DRBG). A pseudorandom number generator is an algorithm for generating a sequence of numbers whose properties approximate the properties of sequences of random numbers. A PRNG-generated sequence is not truly random, because it is completely determined by a relatively small set of initial values, called the PRNG's seed, which may include truly random values.

True random numbers are generated using a hardware random number generator, also referred to as a true random number generator (TRNG). A true random number generator is a device that generates random numbers from a physical process, rather than a computer program. As examples, true random number generators may be based on quantum effects of radioactive isotope decay, atmospheric radio noise, interference of ring oscillators, etc.

SUMMARY

Shortcomings of the prior art are overcome and additional advantages are provided through the provision of a computer program product for facilitating processing in a computing environment. The computer program product comprises a storage medium readable by a processing circuit and storing instructions for execution by the processing circuit for performing a method. The method includes, for instance, obtaining an instruction to be executed, the instruction configured to perform a plurality of functions. The instruction is executed, and the executing includes based on a function code associated with the instruction having a selected value, checking one or more inputs of the instruction to determine which one or more functions of the plurality of functions are to be performed. Based on a first input of the one or more inputs having a first value, performing a function of providing raw entropy, wherein the providing of raw entropy includes storing a number of raw random numbers. Based on a second input of the one or more inputs having a second value, performing another function of providing conditioned entropy, wherein the providing of conditioned entropy includes storing a number of conditioned random numbers.

One instruction is used that may provide raw entropy and/or conditioned entropy. True random numbers are produced using an instruction, and those random numbers facilitate processing within a computing environment, such as highly secure data encryption processing and/or other processing.

As examples, the number of raw random numbers includes a program specified number of raw random numbers, and the number of conditioned random numbers includes a program specified number of conditioned random numbers.

In one embodiment, the function code is provided in a register associated with the instruction, and the one or more inputs are provided in one or more registers indicated by the instruction.

As one example, the one or more inputs include at least one length value. For instance, the one or more inputs include a first length value and a second length value, and the checking includes checking the first length value and the second length value. Based on the first length value having the first value, the number of raw random numbers is stored; and based on the second length value having the second value, the number of conditioned random numbers is stored.

As examples, the first value is a value greater than zero and the second value is a value greater than zero.

In a further embodiment, based on the function code having another selected value, a raw-to-conditioned ratio is provided. The raw-to-conditioned ratio indicates, e.g., a number of bytes of raw entropy used to produce a corresponding number of bytes of conditioned entropy. The providing includes, for instance, storing a count of the number of bytes of raw entropy in one location of a parameter block, and a count of the number of bytes of conditioned entropy in another location of the parameter block.

One instruction may be used to provide raw entropy, conditioned entropy and/or a raw-to-conditioned ratio.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1A:
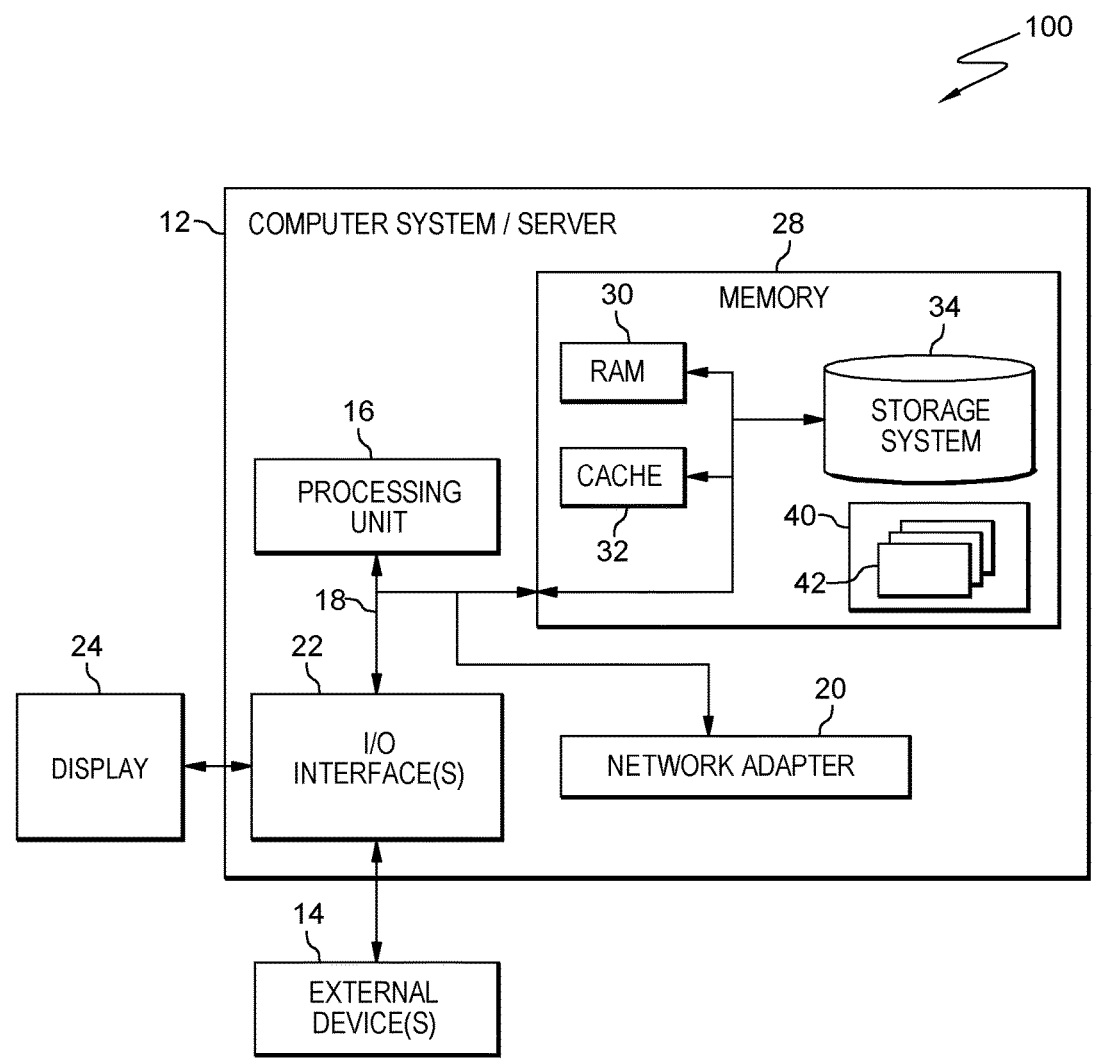
FIG. 1A depicts one example of a computing environment to incorporate and use one or more aspects of the present invention.

In accordance with one or more aspects, true random numbers are provided. The true random numbers may be used, for instance, in highly secure data encryption processing, as well as in other processing. As one example, in accordance with an aspect of the present invention, an instruction (e.g., an architected machine instruction) is provided that produces true random numbers. The instruction may produce raw entropy, which is directly from the noise source; conditioned entropy, which is the raw entropy processed by a pseudorandom number generator; or both. Additionally, in one aspect, the instruction further provides a raw-to-conditioned ratio that indicates the ratio of raw-to-conditioned output. Even further, the instruction may provide one or more other functions. Many variations exist.

The National Institute of Standards and Technology (NIST) DRAFT Special Publication 800-90B, Recommendation for the Entropy Sources Used for Random Bit Generation, describes an entropy-source model for a TRNG that includes (a) a noise source (and digitization thereof), (b) optional conditions, and (c) health checking. The noise source may include any of the mechanisms listed above; as examples, a radioactive isotope decay, atmospheric radio noise, interference of ring oscillators, etc. The conditioning may be used to reduce any potential bias in the noise source or to increase its rate of entropy. The health check ensures that the noise source and entropy source continue to operate within expected parameters.

Pursuant to at least one aspect of the NIST Recommendation, an instruction, referred to herein as a Perform Random Number Operation instruction is provided, that produces raw and/or conditioned entropy, and is able to provide a ratio of raw-to-conditioned output.

One embodiment of a computing environment to incorporate and use one or more aspects of the present invention is described with reference to FIG. 1A. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

As shown in FIG. 1A, a computing environment 100 includes, for instance, a computer system/server 12, which may include, but is not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 1B:
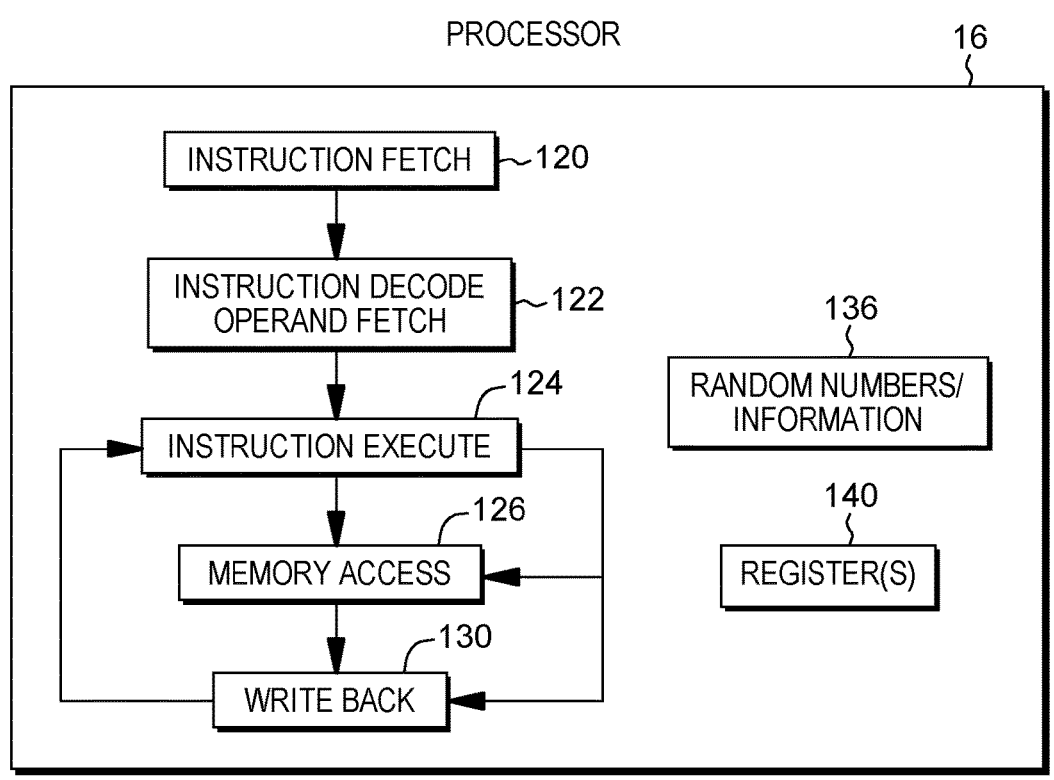
FIG. 1B depicts further details of the processor of FIG. 1A.

Processor 16 includes a plurality of functional components used to execute instructions. As depicted in FIG. 1B, these functional components include, for instance, an instruction fetch component 120 to fetch instructions to be executed; an instruction decode unit 122 to decode the fetched instructions and to obtain operands of the decoded instructions; instruction execution components 124 to execute the decoded instructions; a memory access component 126 to access memory for instruction execution, if necessary; and a write back component 130 to provide the results of the executed instructions. One or more of these components may, in accordance with an aspect of the present invention, provide true random numbers or information associated therewith 136, as described further below.

Processor 16 also includes, in one embodiment, one or more registers 140 to be used by one or more of the functional components.

Figure 2A:
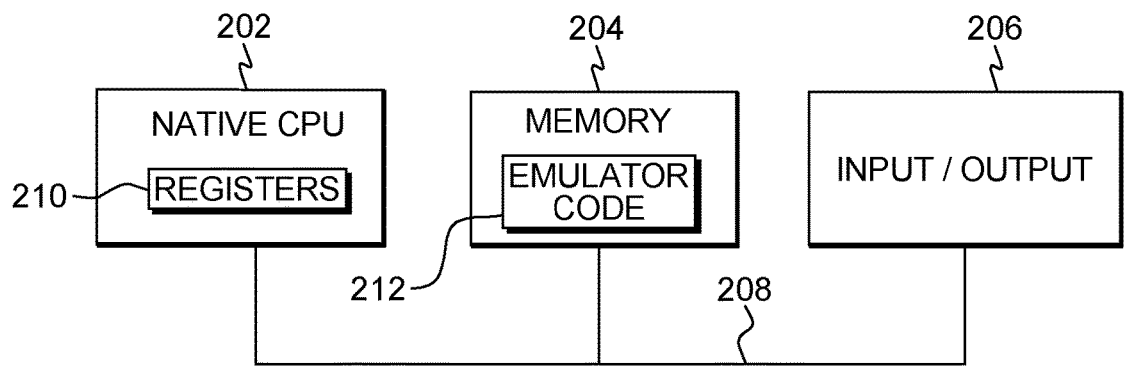
FIG. 2A depicts another example of a computing environment to incorporate and use one or more aspects of the present invention.

Another embodiment of a computing environment to incorporate and use one or more aspects is described with reference to FIG. 2A. In this example, a computing environment 200 includes, for instance, a native central processing unit (CPU) 202, a memory 204, and one or more input/output devices and/or interfaces 206 coupled to one another via, for example, one or more buses 208 and/or other connections. As examples, computing environment 200 may include a PowerPC processor or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represent the state of the environment at any particular point in time.

Moreover, native central processing unit 202 executes instructions and code that are stored in memory 204. In one particular example, the central processing unit executes emulator code 212 stored in memory 204. This code enables the computing environment configured in one architecture to emulate another architecture. For instance, emulator code 212 allows machines based on architectures other than the z/Architecture, such as PowerPC processors, pSeries servers, HP Superdome servers or others, to emulate the z/Architecture and to execute software and instructions developed based on the z/Architecture.

Figure 2B:
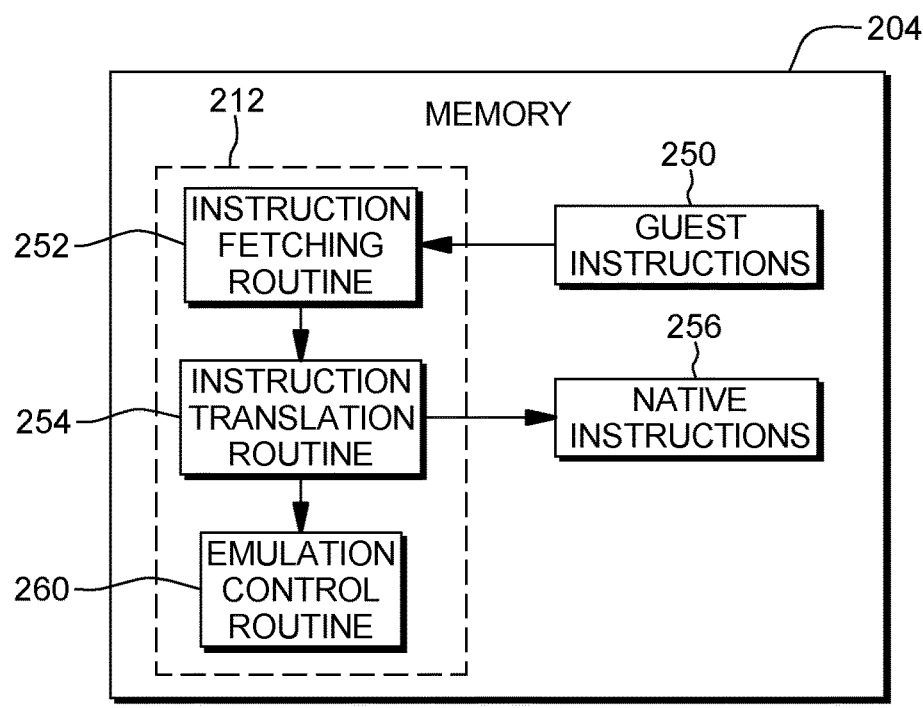
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a z/Architecture processor 102, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, a guest instruction 250 that is obtained, translated and executed is the Perform Random Number Operation instruction described herein. The instruction, which is of one architecture (e.g., the z/Architecture), is fetched from memory, translated and represented as a sequence of native instructions 256 of another architecture (e.g., PowerPC, pSeries, Intel, etc.). These native instructions are then executed.

Details relating to one embodiment of a Perform Random Number Operation instruction, including explicit and implicit fields of the instruction, as well as execution by a processor (either in a native or emulated system), are described herein. In accordance with an aspect of the present invention, the Perform Random Number Operation instruction provides a plurality of functions, including, but not limited to, a query function used to provide an indication of available functions; a pseudorandom number function (e.g., SHA-512-DRNG function); a true random number function (TRNG) that produces raw entropy, conditioned entropy, or both; and a query raw-to-conditioned ratio function, each of which is described in further detail below. In other embodiments, one or more of the functions may not be supported or provided, and/or one or more other functions may be offered. Many possibilities exist.

Figure 3A:
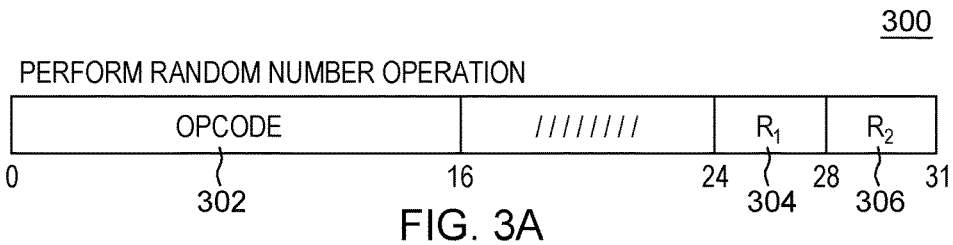
FIG. 3A depicts one embodiment of a format of a Perform Random Number Operation instruction, in accordance with an aspect of the present invention.

One embodiment of a Perform Random Number Operation instruction is described with reference to FIG. 3A. In one example, a Perform Random Number Operation instruction 300 includes an opcode field 302 (e.g., bits 0-15) having an operation code (opcode) to indicate a perform random number operation; a first register field 304 (e.g., bits 24-27) used to designate at least one first register ($R_1$); and a second register field 306 (e.g., bits 28-31) used to designate at least one second register ($R_2$). Each of the fields 304-306, in one example, is separate and independent from the opcode field. Further, in one embodiment, they are separate and independent from one another; however, in other embodiments, more than one field may be combined.

In one example, the format of the instruction is a register-and-register operation with an extended opcode field. With this format, the contents of the even-odd register pair designated by the $R_1$ field contain the address and length of the first operand. Similarly, the contents of the even-odd register pair designated by the $R_2$ field contain the address and length of the second operand.

In addition to $R_1$ and $R_2$ encoded in the instruction, one implementation of the instruction uses one or more implied registers including, for instance, general register 0 (GR0) and general register 1 (GR1). Each of the registers is further described below with reference to FIGS. 3B-3G.

Figure 3B:
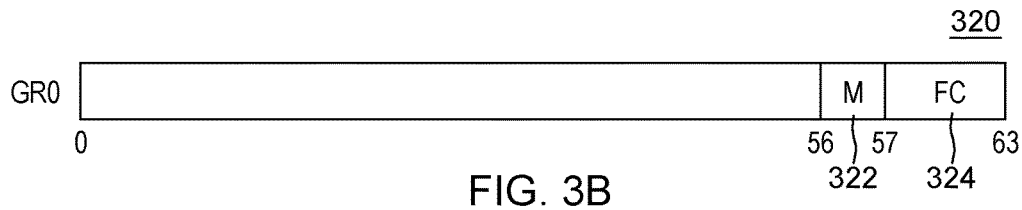
FIG. 3B depicts one example of the contents of a general register, general register 0 (GR0), to be used by one or more aspects of the Perform Random Number Operation instruction of FIG. 3A, in accordance with an aspect of the present invention.

Referring initially to FIG. 3B, one embodiment of a format of general register 0 (320) is described. In one example, general register 0 includes a modifier (M) control 322 (e.g., bit 56), and a function code (FC) field 324 (e.g., bits 57-63). The function code field includes a function code specifying a function to be performed. Some of the functions may use a parameter block, as indicated herein. In one example, the assigned function codes include: code 0 for a query function, which has an assigned parameter block size of 16; a code 3 for an SHA-512-DRNG (Deterministic Random Number Generator) function, which has an assigned parameter block size of 240; a code 112 for a Perform Random Number Operation-TRNG-Query Raw-to-Conditioned Ratio function, which has an assigned parameter block size of 8; and a code 114 for a Perform Random Number Operation-TRNG, which does not use the parameter block. Should bits 57-63 of general register 0 designate an unassigned or uninstalled function code, a specification exception is recognized, in one implementation.

Figure 3C:
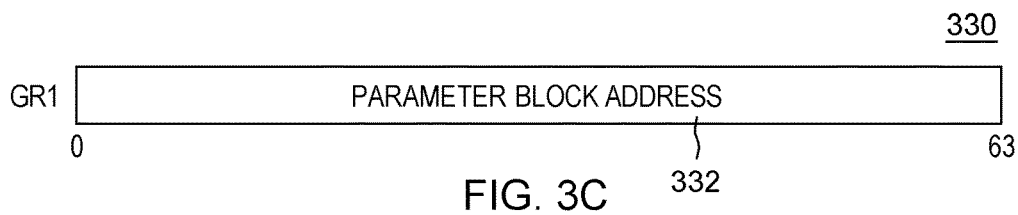
FIG. 3C depicts one example of the contents of another general register, general register 1 (GR1), to be used by the Perform Random Number Operation instruction of FIG. 3A, in accordance with an aspect of the present invention.
Figure 3D:
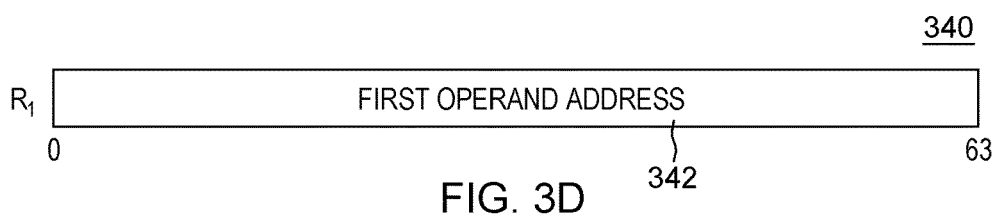
FIG. 3D depicts one example of the contents of a register $R_1$ to be used in one or more aspects by the Perform Random Number Operation instruction of FIG. 3A, in accordance with an aspect of the present invention.
Figure 3E:
FIG. 3E depicts one example of the contents of a register $R_1+1$ to be used in one or more aspects by the Perform Random Number Operation instruction of FIG. 3A, in accordance with an aspect of the present invention.
Figure 3F:
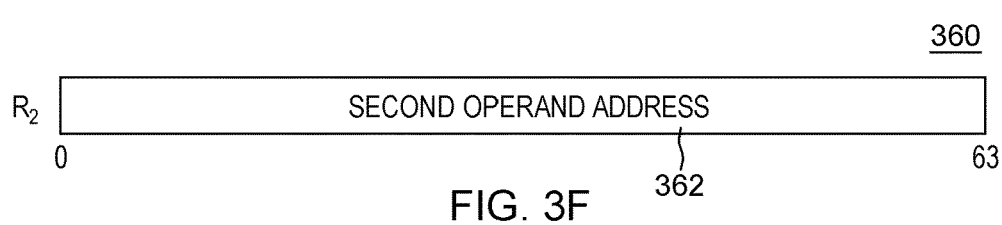
FIG. 3F depicts one example of the contents of a register $R_2$ to be used in one or more aspects by the Perform Random Number Operation instruction of FIG. 3A, in accordance with an aspect of the present invention.
Figure 3G:
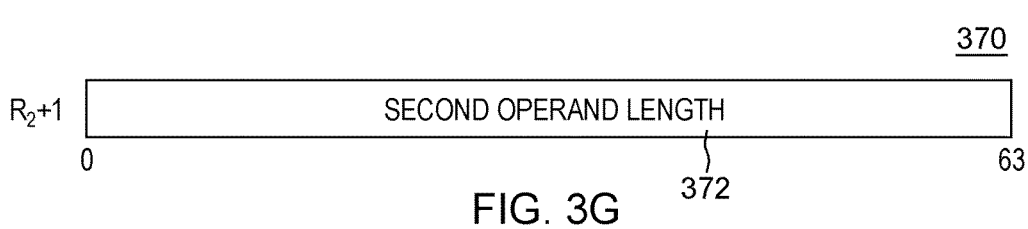
FIG. 3G depicts one example of the contents of a register $R_2+1$ to be used in one or more aspects by the Perform Random Number Operation instruction of FIG. 3A, in accordance with an aspect of the present invention.

Depending on the function, a parameter block, a first operand, and/or a second operand in storage may be accessed by the instruction. When applicable, general register 1, as shown in FIG. 3C at 330, includes an address 332 of the leftmost byte of the parameter block in storage. Further, when applicable, general registers $R_1$ and $R_2$ designate an even-odd pair of general registers corresponding to the first and second operands, respectively. The even-numbered registers $R_1$ (340, FIG. 3D), $R_2$ (360, FIG. 3F) contain an address 342, 362 of the operand in storage, and the odd-numbered registers $R_1+1$ (350, FIG. 3E), $R_2+1$ (370, FIG. 3G) contain the length 352, 372 of the respective operand. The storage location corresponding to an operand is accessed when the length of the corresponding operand is nonzero.

The general registers that contain an address are subject, in one embodiment, to the current addressing mode. For instance, in the 24-bit addressing mode, the contents of bit positions 40-63 of the register constitute the address of the storage location, and the contents of bit positions 0-39 are ignored. In the 31-bit addressing mode, the contents of bit positions 33-63 of the register constitute the address of the storage location, and the contents of bit positions 0-32 are ignored. In the 64-bit addressing mode, the contents of bit positions 0-63 of the register constitute the address of the storage location. In the access register mode, general register 1, $R_1$, and $R_2$ specify the address space containing the parameter block, first operand and second operand, respectively.

The odd-numbered registers containing an operand's length are also subject to the current addressing mode. In either the 24- or 31-bit addressing mode, the contents of bit positions 32-63 of the register form a 32-bit unsigned binary integer which specifies the number of bytes in the storage operand, and bit positions 0-31 are ignored. In the 64-bit addressing mode, the contents of bit positions 0-63 of the register form a 64-bit unsigned binary integer which specifies the number of bytes in the storage operand.

For the query function (e.g., function code 0), which provides a mechanism for indicating the availability of other functions, the contents of general registers $R_1+1$, $R_2$ and $R_2+1$ are ignored.

For the SHA-512-DRNG function (e.g., function code 3), modifier control 322 is used. When the modifier control is zero, a generate operation is performed, and when the modifier control is one, a seed operation is performed. Further, for the SHA-512-DRNG function's generate operation, the first operand length is updated in general register $R_1+1$ at the completion of the instruction. The first operand address in general register $R_1$ is not updated.

For the TRNG query raw-to-conditioned ratio function (e.g., function code 112), the contents of general registers $R_1$, $R_1+1$, $R_2$ and $R_2+1$ are ignored.

For the TRNG function (e.g., function code 114), the first operand address, first operand length, second operand address and second operand length in general registers $R_1$, $R_1+1$, $R_2$, and $R_2+1$, respectively, may be updated at the completion of the instruction. In the 24-bit addressing mode, bits 40-63 of the even-numbered register are incremented by the number of bytes processed for the respective operand, bits 0-31 of the register remain unchanged, and regardless of the operand's length, bits 32-39 of the register may be set to zero or may remain unchanged. In the 31-bit addressing mode, bits 33-63 of the even-numbered register are incremented by the number of bytes processed for the respective operand, bits 0-31 of the register remain unchanged, and regardless of the operand's length, bit 32 of the register may be set to zero or may remain unchanged. In the 64-bit addressing mode, bits 0-63 of the even-numbered register are incremented by the number of bytes processed for the respective operand. In either the 24- or 31-bit addressing mode, bits 32-63 of the odd-numbered register are decremented by the number of bytes processed for the respective operand, and bits 0-31 of the register remain unchanged. In the 64-bit addressing mode, bits 0-63 of the odd-numbered register are decremented by the number of bytes processed by the respective operand.

When the parameter block overlaps any portion of the storage operand, the results are unpredictable.

As observed by other CPUs and the I/O subsystem, references to the parameter block and storage operand may be multiple access references, accesses to these locations are not necessarily block concurrent, and the sequence of these accesses or references is undefined.

Each of the functions is further described below.

Query Function:

In one example, a function code of 0 indicates a query function. Based on indicating the query function, a status word (e.g., 128-bit) is stored in a parameter block associated with the instruction. Bits 0-127 of this field correspond to function codes 0-127, respectively, of the Perform Random Number Operation instruction. When a bit is one, the corresponding function is installed; otherwise, the function is not installed. For instance, if the SHA-512 DRNG function is installed, bit 3, corresponding to function code 3, is set to one. Similarly, if the TRNG-Query Raw-to-Conditioned Ratio function is installed, bit 112, corresponding to function code 112, is set to one; and if the TRNG operation is installed, bit 114, corresponding to function code 114, is set to one.

Condition code 0 is set when execution of the query function completes; condition code 3 (specifying, e.g., partial completion of the function) is not applicable to the query function.

DRNG Function:

In one implementation, a function code of 3 specifies a deterministic random number generator (DRNG) function to be performed. Depending on modifier control 322, e.g., bit 56 of general register 0, the DRNG function performs either a deterministic pseudorandom number generate operation or a deterministic pseudorandom number seed operation, each using, for instance, a 512-bit secure hash algorithm (SHA-512).

Deterministic pseudorandom number generation, also known as deterministic random bit generation, is defined in, for instance, *Recommendation for Random Number Generation Using Deterministic Random Bit Generators*, National Institute of Standards and Technology (NIST), NIST Special Publication 800-90A, January 2012. Further, a description of the secure hash algorithm is found in, for instance, *Secure Hash Standard* (*SHS*), Federal Information Processing Standards Publication, FIPS PUB 180-4, National Institute of Standards and Technology, Gaithersburg, Md., March 2012.

For the DRNG function, a parameter block is used that represents the internal state of a deterministic random number generator. In one example, the parameter block for the DRNG function includes:

Reserved: Bytes 0-3, 16, and 128 of the parameter block are reserved.

Reseed Counter: Bytes 4-7 of the parameter block contain a 32-bit unsigned binary integer indicating the number of times that the instruction has completed with condition code 0 since the parameter block was last instantiated or reseeded.

When the reseed counter contains zero, the following applies:

Execution of the seed operation causes the parameter block to be instantiated with initial values, including setting the reseed counter to a value of one.

Execution of the generate operation results in a specification exception being recognized.

When the reseed counter contains a nonzero value, the parameter block is considered to be instantiated, and the following applies:

Execution of the seed operation causes the parameter block to be reseeded, including resetting the reseed counter to a value of one.

Execution of a generate operation that results in condition code 0 causes the reseed counter to be incremented by one; any carry out of bit position 0 of the reseed counter field is ignored.

Stream Bytes: Bytes 8-15 of the parameter block contain a 64-bit unsigned binary integer. The stream bytes field is set to zero by the execution of the seed operation when instantiating the parameter block (that is, when the reseed counter is zero); the field is not changed by the execution of the seed operation when the parameter block is already instantiated.

Partial or full completion of a generate operation causes the contents of the stream bytes field to be incremented by the number of bytes stored into the first operand; any carry out of bit position 0 of the stream bytes field is ignored.

Value (V): Bytes 17-127 of the parameter block contain, for instance, an 888-bit value indicating the internal state of the random number generator represented by the parameter block. V is initialized by the execution of the seed operation when instantiating the parameter block. V is updated by either (a) the execution of the seed operation when the reseed counter is nonzero, or (b) the execution of the generate operation that ends in condition code 0.

Constant (C): Bytes 129-239 of the parameter block contain, for instance, an 888-bit value indicating the internal state of the random number generator represented by the block. C is initialized by the execution of the seed operation, and inspected by the generate operation.

The same parameter block format is used by both the generate operation and the seed operation (including instantiation and reseeding). A parameter block containing all zeros is considered not to be instantiated. The program should zero the parameter block prior to issuing the seed operation to instantiate the parameter block, and subsequently, the program should not alter the contents of the parameter block except to zero it; otherwise, unpredictable results may be produced by the instruction.

Further details regarding the seed operation and the generate operation of the DRNG function (also referred to herein as the SHA-512-DRNG function) are described below.

The SHA-512-DRNG seed operation instantiates or reseeds a deterministic pseudorandom number generation parameter block using, e.g., the 512-bit secure hash algorithm. In one embodiment, the operation is performed by a processor; however, in other embodiments, it is performed by other components or co-processors.

Depending on whether the reseed counter in bytes 4-7 of the parameter block is zero or nonzero, an instantiation or reseeding operation is performed, respectively. Further details of instantiation and reseeding are described below.

For the instantiation operation, the second operand in storage includes one or more of entropy input, nonce, and an optional personalization string, each of which is described below. This information is used to form seed material.

As an example, entropy input is an input bitstring that provides an assessed minimum amount of unpredictability for a Deterministic Random Bit Generator (DRBG) mechanism. A DRBG mechanism is the portion of a random bit generator (RBG) that includes the functions to instantiate and uninstantiate the RBG, generate pseudorandom bits, optionally reseed the RBG, and test the health of the DRBG mechanism.

A Random Bit Generator (RBG) is a device, algorithm, technique or mechanism that outputs a sequence of binary bits that appear to be statistically independent and unbiased. One example of an RBG is a DRBG. A DRBG is, for instance, an RBG that includes a DRBG mechanism and (at least initially) has access to a source of entropy input. The DRBG produces a sequence of bits from a secret initial value called a seed, along with other possible inputs.

A seed is a string of bits that is used as input to a DRBG mechanism. The seed determines a portion of the internal state of the DRBG, and its entropy is to be sufficient to support the security strength of the DRBG. Entropy is a measure of the disorder, randomness or variability in a closed system. Min-entropy is the measure used in one implementation.

The min-entropy (in bits) of a random variable X is the largest value m having the property that each observation of X provides at least m bits of information (i.e., the min-entropy of X is the greatest lower bound for the information content of potential observations of X). The min-entropy of a random variable is a lower bound on its entropy. A formulation for min-entropy is $-(\log_2 \max p_i)$ for a discrete distribution having probabilities $p_1, \ldots, p_n$. Min-entropy is often used as a worst case measure of the unpredictability of a random variable.

Nonce is a time-varying value that has at most a negligible chance of repeating, e.g., a random value that is generated anew for each use, a timestamp, a sequence number, or some combination of these.

Personalization string is an optional string of bits that is combined with a secret entropy input and (possibly) a nonce to produce a seed.

For the reseed operation (a reseed acquires additional bits that affect the internal state of the DRBG mechanism), the second operand in storage includes entropy input and optional additional input, used to form the seed material. The optional additional input may be any desired information that adds further randomness, such as a time value or other arbitrary values, as examples.

When performing an instantiation operation, seed material is formed using the second operand. For instance, input values of the second operand are concatenated to form the seed material. However, when performing a reseed operation, seed material is formed, from a concatenation of, for instance, the value 01 hex, the contents of the V field of the parameter block, and contents of the second operand.

For either the instantiation or reseed operation, one or more seed values are initialized/updated. One such seed value is $V_{new}$, which is formed as follows, in one example:

a one byte counter, a four-byte value of 888, seed material (formed as described above), and padding are concatenated and used as input to, e.g., a SHA-512 algorithm, along with an initial hash value (also referred to as an initial chaining value). In one embodiment, the padding is a value of 80 hex, concatenated with 0-127 bytes of zeros, concatenated with a 16-byte binary integer designating the length in bits of the input to the SHA-512 algorithm not including the padding (that is, the length of the one-byte counter, four-byte value of 888, and the seed material). The initial hash value is, for instance, a 64 byte value.

The SHA-512 algorithm is invoked twice to form two 64-bit hashed results; the one-byte counter contains the value 1 for the first invocation of the SHA-512 algorithm, and it contains the value 2 for the second invocation. The second invocation also uses a four byte value of 888, seed material, and padding as input to the SHA-512 algorithm, along with an initial hash value to form a 64-bit hashed result.

The two 64-byte hashed results are concatenated together, and, in this example, the leftmost 111 bytes of the 128-byte concatenation form the new Value field ($V_{new}$) in the parameter block.

Similar to the formation of the $V_{new}$ field, a new constant field ($C_{new}$) is formed during both the instantiation or reseeding operation. $C_{new}$ is another seed value stored in the parameter block. A one byte counter, a four-byte value of 888, a one byte value of zero, $V_{new}$ field, and padding are concatenated and used as input to, e.g., a SHA-512 algorithm, along with an initial hash value. The padding is, for instance, a value of 80 hex, concatenated with 122 bytes of zeros, concatenated with a 16-byte binary integer designating the length in bits of the input to the SHA-512 algorithm not including the padding (that is, the length of the one-byte counter, four-byte value of 888, one-byte value of zero, and the $V_{new}$ field).

The SHA-512 algorithm is invoked twice to form two 64-bit hashed results; the one-byte counter contains the value 1 for the first invocation of the SHA-512 algorithm, and it contains the value 2 for the second invocation. The second invocation also uses a four byte value of 888, a one byte value of zero, $V_{new}$ field, and padding as input to SHA-512 algorithm, along with an initial hash value.

The two 64-byte hashed results are concatenated together, and, in this example, the leftmost 111 bytes of the 128-byte concatenation form the new constant field ($C_{new}$).

For either the instantiate or reseed operation, the reseed counter field in the parameter block is set to the value of one. For the instantiate operation, the stream bytes field in the parameter block is set to zeros; the stream bytes field remains unchanged by a reseed operation.

Condition code 0 is set when execution of the SHA-512-DRNG seed operation completes; condition code 3 is not applicable to the seed operation.

The SHA-512-DRNG generate operation generates pseudorandom numbers using the parameter block instantiated or reseeded, as described above, as well as, e.g., the 512-bit secure hash algorithm. In one embodiment, the operation is performed by a processor; however, in other embodiments, it is performed by other components or co-processors.

General register $R_1$ includes the address of, e.g., the leftmost byte of the first operand. When the first operand length in general register $R_1+1$ is nonzero, the first operand is stored in right-to-left order in units of 64-byte blocks, except that the rightmost block may contain fewer than 64 bytes. The number of blocks to be stored, including any partial rightmost block, is determined by rounding the first operand length in general register $R_1+1$ up to a multiple of 64 and dividing the value by 64. The blocks of the first operand are numbered from left to right as 0 to n−1, where n−1 represents the rightmost block.

The following procedure is performed for each block of the first operand location, beginning with the rightmost (n−1) block and proceeding to the left.

1. The value (V) from the parameter block is added to the block number being processed, with any overflow from the addition ignored.
2. The 111-byte sum of this addition, concatenated with 17 bytes of padding, are used as input to, e.g., the SHA-512 algorithm, resulting in a 64-byte hashed value. The 17-byte padding provided to the SHA-512 algorithm consists of a value of 80 hex followed by a 16-byte binary integer value of 888 (the length of V in bits).
3. If the first operand length in general register $R_1+1$ is a multiple of 64, then the resulting 64-byte hashed value is stored in the respective block of the first operand location, and the length in general register $R_1+1$ is decremented by 64.

If the first operand length is not a multiple of 64, then the leftmost m bytes of the resulting 64-byte hashed value is stored in the rightmost partial block of the first operand, where m represents the remainder of the first operand length divided by 64. In this case, the length in general register $R_1+1$ is decremented by m.
4. Regardless of whether a full or partial block is stored, the stream-bytes field in, e.g., bytes 8-15 of the parameter block is incremented by the number of bytes stored into the first operand location.

The above process is repeated until either the first operand length in general register $R_1+1$ is zero (called normal completion) or a CPU-determined number of blocks has been processed (called partial completion). The CPU-determined number of blocks depends on the model, and may be a different number each time the instruction is executed. The CPU-determined number of blocks is usually nonzero. In certain unusual situations, this number may be zero, and condition code 3 may be set with no progress. However, the CPU protects against endless reoccurrence of this no-progress case.

When the first-operand length in general register $R_1+1$ is initially zero, normal completion occurs without storing into the first operand location; however, the parameter block is updated as described below.

When the pseudorandom-number-generation process ends due to normal completion, the parameter block is updated as described below.

1. A one byte value of 03 hex, 111-byte value (V) from the parameter block, and 144 bytes of padding are used as input to, e.g., the SHA-512 algorithm, resulting in a 64-byte hashed value. The padding consists of a value of 80 hex, concatenated with 127 bytes of zeros, concatenated with a 16-byte binary integer designating the length in bits of the input to the SHA-512 algorithm not including the padding (that is, the length of the one-byte value of 03 hex and the V field). The values of the 4-byte reseed-counter field and the 111-byte value (V) and constant (C) fields in the parameter block, and the 64-byte hashed value (from the above computation) are added. For the purposes of this addition, each value is treated as an unsigned binary integer, extended to the left with zeros as necessary. Any overflow from the addition is ignored, and the resulting 111-byte sum replaces the value field in the parameter block ($V_{new}$).
2. The 4-byte reseed-counter field in the parameter block is incremented by one.
3. Condition code 0 is set.

When the pseudorandom-number-generation process ends due to partial completion, the first operand length in general register $R_1+1$ contains a nonzero multiple of 64, the reseed-counter and value (V) fields in the parameter block are not updated, and condition code 3 is set.

For a generate operation, access exceptions may be reported for a larger portion of the first operand than is processed in a single execution of the instruction. However, access exceptions are not recognized for locations that do not encompass the first operand nor for locations more than 4K bytes from the current location being processed.

For a generate operation, when the operation ends due to normal completion, condition code 0 is set and the resulting value in general register $R_1+1$ is zero. When the operation ends due to partial completion, condition code 3 is set and the resulting value in general register $R_1+1$ is nonzero.

TRNG Query Raw-to-Conditioned Ratio Function:

Another available function of the Perform Random Number Operation instruction is the TRNG query raw-to-conditioned ratio function. In one implementation, when function code 324 of the Perform Random Number Operation instruction is 112, the TRNG query raw-to-conditioned ratio function may be used to determine the ratio of raw-to-conditioned entropy produced when both types of entropy are requested by the TRNG function.

Figure 3H:
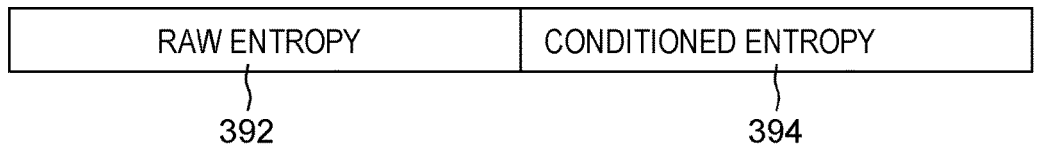
FIG. 3H depicts one example of a format of a parameter block for use by the Perform Random Number Operation instruction of FIG. 3A, in accordance with an aspect of the present invention.

In operation of this function, a parameter block is stored with, e.g., two 32-bit unsigned binary integers indicating the number of bytes in a block of raw entropy that are used to produce a block of conditioned entropy. In one example, with reference to FIG. 3H, a parameter block 390 includes a raw entropy field 392 and a conditioned entropy field 394. Raw entropy field 392 includes a value for raw entropy, which is the numerator in a fraction designating the ratio of raw entropy-to-conditioned entropy. This value is obtained from a stored location, such as in memory, a register, other hardware device, etc., and placed in raw entropy field 392. Conditioned entropy field 394 includes a value for conditioned entropy, which is the denominator in the fraction designating the ratio of raw entropy-to-conditioned entropy. Again, this value is obtained from a stored location, such as in memory, a register, other hardware device, etc., and placed in conditioned entropy field 394.

The raw entropy-to-conditioned entropy ratio indicates the number of bytes in a block of raw entropy that are used to produce a block of conditioned entropy.

Condition code 0 is set when execution of the TRNG query raw-to-conditioned function completes; condition code 3 is not applicable to this function.

TRNG Function:

Further, when the function code of the Perform Random Number Operation instruction is 114, a TRNG function is performed. For instance, a series of hardware-generated random numbers is stored at either or both the first- and second-operand locations. A parameter block is not used for this function, and general register 1 is ignored, in one embodiment.

The $R_1$ field designates an even-odd pair of general registers. The even-numbered register contains the address of the leftmost byte of the first operand, and the odd-numbered register contains the length of the first operand.

The first operand includes random numbers in the form of raw entropy, produced, for instance, directly by a hardware source (e.g., a noise source).

The $R_2$ field designates an even-odd pair of general registers. The even-numbered register contains the address of the leftmost byte of the second operand, and the odd-numbered register contains the length of the second operand. The second operand includes random numbers extracted from the raw entropy source and then conditioned by an approved algorithm (e.g., processed by a PRNG based on, e.g., a SHA-256 algorithm).

Figure 4:
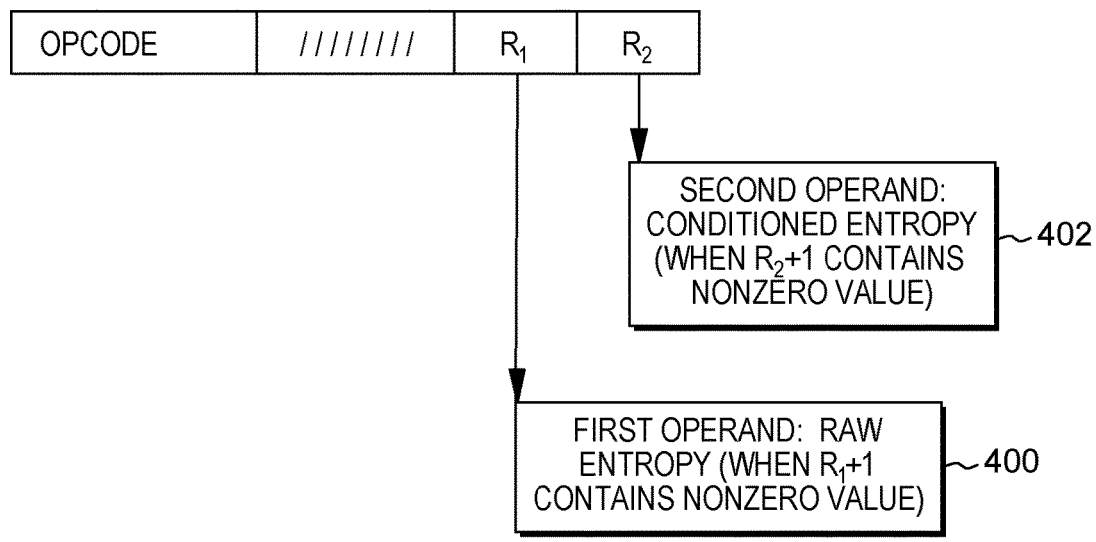
FIG. 4 depicts one example of processing associated with a Perform Random Number Operation, in accordance with an aspect of the present invention.

The ratio of raw entropy bits used to produce conditioned entropy bits may be determined by the TRNG query raw-to-conditioned ratio function. In one example, the ratio is 6:1, but this is only an example. When the length of the first operand is nonzero, the raw entropy is stored at the first operand location (see 400 in FIG. 4); similarly, when the length of the second operand is nonzero, the conditioned entropy is stored at the second operand location (402 in FIG. 4). When the lengths of both the first and second operands are nonzero, the raw and conditioned entropy are stored at the first and second operand locations, respectively, in the raw-to-conditioned ratio. The number of bytes stored in a single unit of operation is model dependent, and may vary from one execution of the instruction to another.

When the length of the first operand is nonzero, but the length of the second operand is zero, the process continues with storing the raw entropy in the first operand. Similarly, when the length of the second operand is nonzero, but the length of the first operand is zero, the process continues with storing the conditioned entropy in the second operand.

Access exceptions may be reported for a larger portion of the first and second operands than is processed in a single execution of the instruction. However, access exceptions are not recognized for locations that do not encompass the first or second operand nor for locations more than 4K bytes from the current location being processed.

The process continues either until both operand lengths are zero (called normal completion), or until a CPU-determined number of bytes have been stored (called partial completion), whichever occurs first. When the operation ends due to normal completion, condition code 0 is set. When the operation ends due to partial completion, condition code 3 is set. The CPU-determined number of bytes depends on the model, and may be a different number each time the instruction is executed. The CPU-determined number of bytes is usually nonzero. In certain unusual situations, this number may be zero, and condition code 3 may be set with no progress. However, the CPU protects against endless reoccurrence of this no-progress case.

Regardless of whether the operation ends due to normal or partial completion, general registers $R_1$ and $R_1+1$ are incremented and decremented, respectively, by the number of bytes stored into the first operand, and general registers $R_2$ and $R_2+1$ are incremented and decremented, respectively, by the number of bytes stored into the second operand.

If the first and second operands overlap, the results are unpredictable. As examples, a specification exception is recognized and no other action is taken, if any of the following conditions exist: Bits 57-63 of general register 0 specify an unassigned or uninstalled function code; the $R_1$ or $R_2$ fields designate an odd-numbered register or general register 0. This exception is recognized regardless of the function code; for the SHA-512-DRNG function's seed operation, the length in general register $R_2+1$ is greater than 512. For the SHA-512-DRNG function's generate operation, a general operand data exception is recognized, if the reseed counter in the parameter block is zero.

In accordance with one or more aspects, the TRNG function may be useful when implementing a hybrid random-number generator, using the conditioned entropy source from TRNG to periodically reseed a deterministic random number generation (such as that provided by the SHA-512-DRNG function).

The conditioned entropy provided by the TRNG function may be shared by multiple, independently-seeded deterministic random number generators. Independence may be achieved by a unique program-supplied entropy, nonce, or personalization string when seeding a deterministic random number generator.

The raw entropy provided by the first operand is intended for use, in one example, by diagnostic programs that test the quality of entropy provided by the function.

In one example, the ratio of raw-to-conditioned entropy provided by the function is constant across all processors of the same model type. Therefore, once the program has determined the ratio, it need not re-execute the TRNG query raw-to-conditioned ratio function unless it is relocated to another model type.

Although entropy is produced by the TRNG function in the raw-to-condition ratio reported by the TRNG query-raw-to-conditioned ratio function, the program is in no way obliged to request raw and conditioned entropy in that ratio.

As observed by the CPU, other CPUs, and the I/O subsystem, inconsistent results may be briefly stored in a location defined to be stored for a particular function.

In the above examples, a function code is provided in order to use a single instruction for a plurality of functions. However, if only one function is provided, then the function code may not be used. Additionally, more, fewer or different function codes may be used to include more, fewer or different functions. Many possibilities exist. Additionally, in one embodiment, a modifier control is provided to be used by one of the functions. However, in one or more other embodiments, the modifier control may not be included if the supported functions do not use it.

As described herein, a single CPU instruction, having multiple functions, is provided. One function code of the instruction is to produce either or both of (a) a program-specified number of raw random numbers (that is, directly from the hardware TRNG source), and/or (b) a program-specified number of conditioned random numbers derived from the raw random numbers. Another function of the instruction is to store a ratio, X/Y, where X indicates the number of true random numbers used to produce Y conditioned random numbers.

Figure 5A:
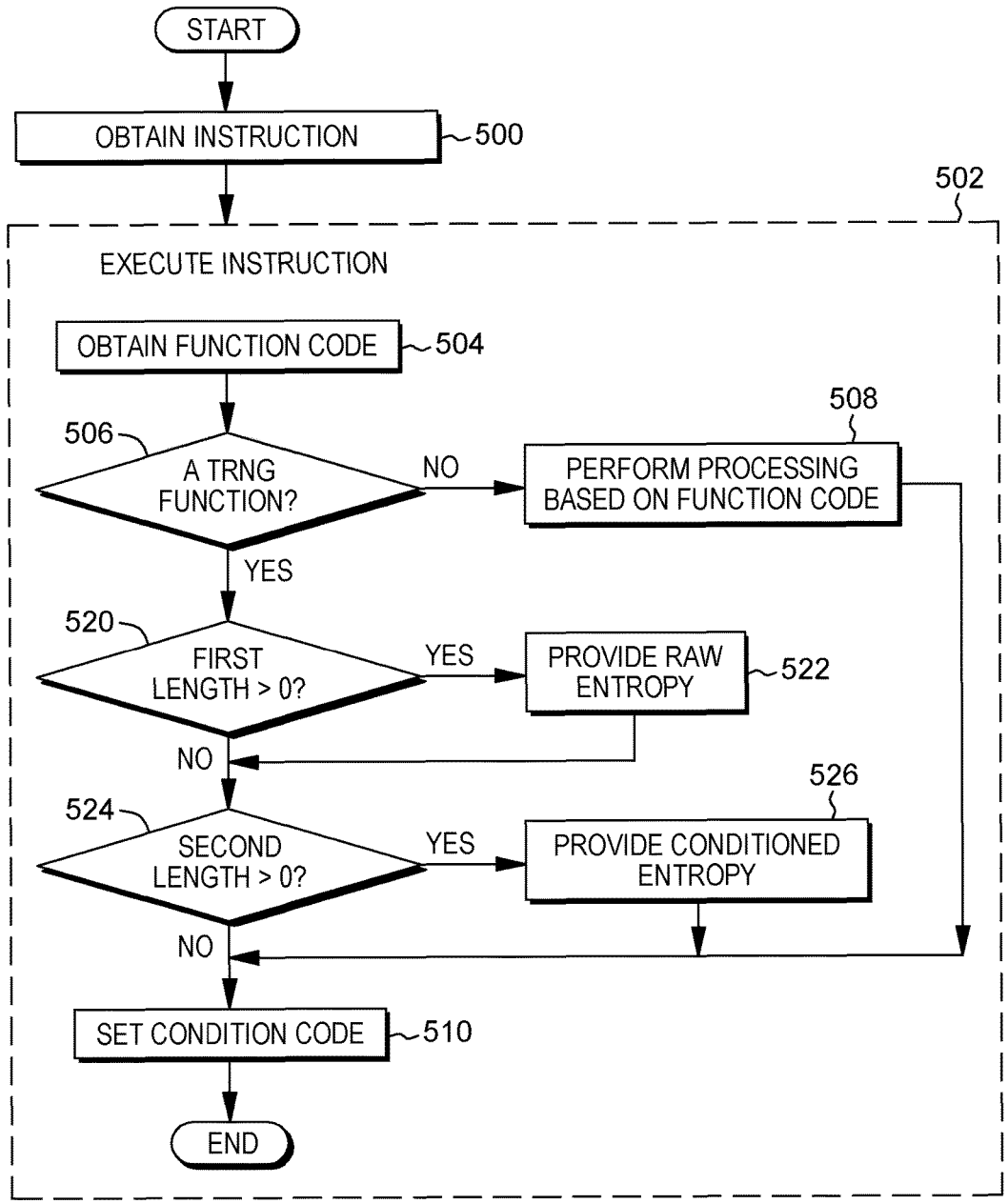
FIG. 5A depicts one example of processing associated with a true random number generator function of the Perform Random Number Operation instruction, in accordance with an aspect of the present invention.

Further details regarding one embodiment of the true random number generator function are described with reference to FIG. 5A. Initially, the instruction is obtained, STEP 500. Execution of the instruction (on at least one processor) then proceeds, STEP 502. Based on executing the instruction, a function code is obtained, STEP 504, and a determination is made as to whether the true random number generator function is being requested, INQUIRY 506. If it is not a true random number generator function being specified, then processing is performed based on the function code as described above, STEP 508. A condition code is then set, STEP 510, and processing is complete. However, if it is a true random number generator function being specified by the function code, then a further determination is made as to whether a first length (e.g., specified in $R_1+1$) is greater than zero, INQUIRY 520. If the first length is greater than zero, then raw entropy is provided, STEP 522. Thereafter, or if the first length is not greater than zero, processing proceeds to determine whether a second length (e.g., specified in $R_2+1$) is greater than zero, INQUIRY 524. If the second length is greater than zero, then conditioned entropy is provided, STEP 526. If the second length is not greater than zero or after providing the conditioned entropy, a condition code is set, STEP 510.

Yet further details of one embodiment of a true random number generator function are described with reference to FIG. 5B. The logic is executed on at least one processor.

Figure 5B:
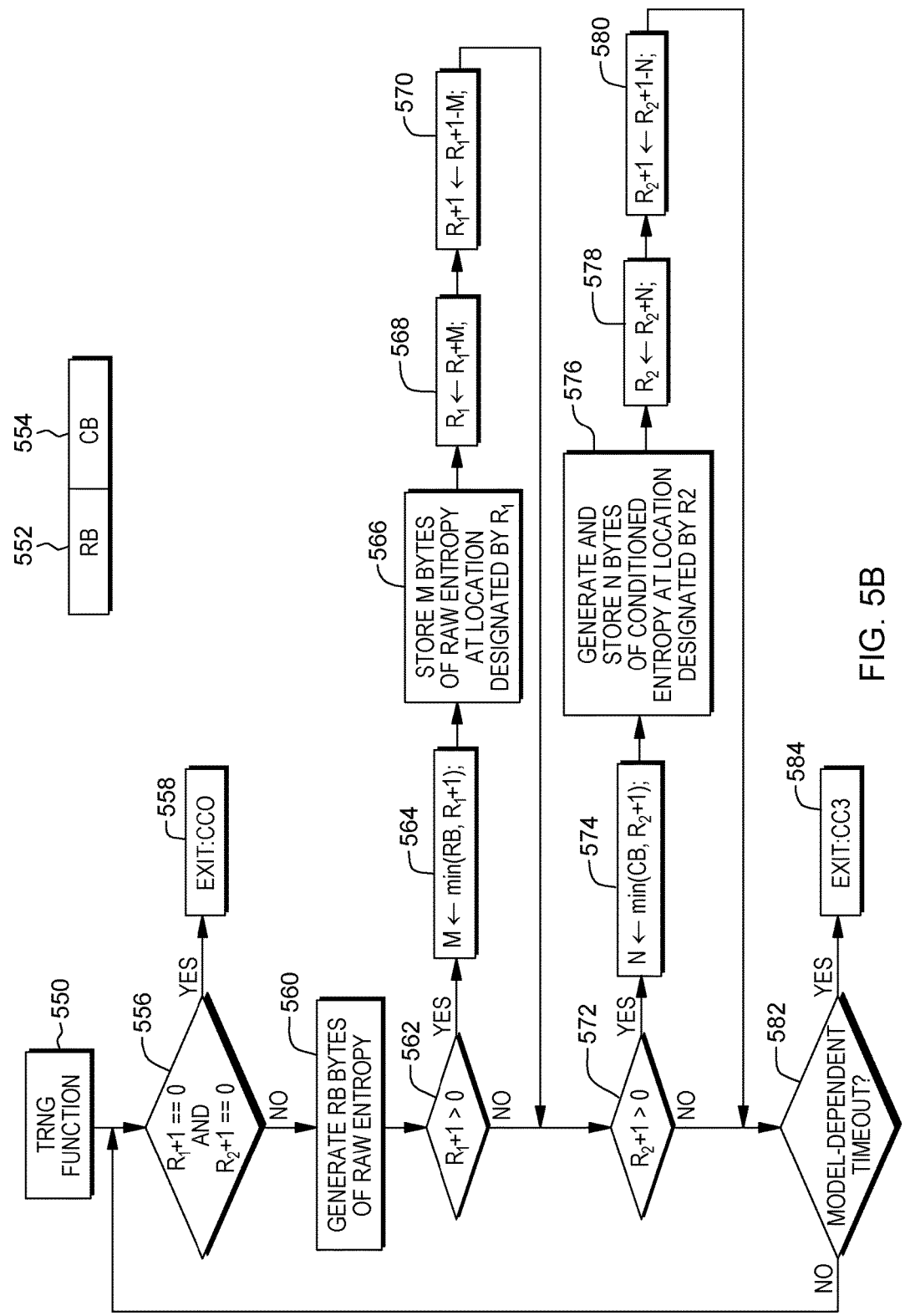
FIG. 5B depicts another example of processing associated with a true random number generator function of the Perform Random Number Operation instruction, in accordance with an aspect of the present invention.

Referring to FIG. 5B, initially, operation of the TRNG function begins, STEP 550. This example references the ratio of raw-to-conditioned bytes produced by the Query Raw-to-Conditioned Ratio function. The number of raw bytes (RB) used to produce a number of conditioned bytes (CB) is shown in 552 and 554, respectively.

The function determines whether there are additional true random numbers to be stored, INQUIRY 556. If, for example, the values of both register $R_1+1$ and $R_2+1$ are zero, the function is completed, and an indication of completion is set, STEP 558, (for example, the condition code is set to zero), and the instruction completes.

If the determination in INQUIRY 556 indicates that there are additional bytes to be stored, the function then acquires RB bytes of raw data from the hardware entropy source, STEP 560.

The function determines whether raw data is to be stored, INQUIRY 562 (for example, the value in register $R_1+1$ is nonzero). If so, the function computes the number of bytes to be stored (M) as the minimum of RB and the value in register $R_1+1$, STEP 564. The function stores M bytes of raw data at a designated location, STEP 566, (for example at the memory address in register $R_1$). The function increments the memory address (register $R_1$) by M, and decrements the number of bytes remaining to be stored (register $R_1+1$) by M in STEPS 568 and 570, respectively, and continues with INQUIRY 572.

At INQUIRY 572, the function determines whether conditioned data is to be stored (for example, the value in register $R_2+1$ is nonzero). If so, the function computes the number of bytes to be stored (N) as the minimum of CB and the value in register $R_2+1$, STEP 574. The function generates N bytes of conditioned data from the raw data, and stores the N bytes of conditioned data at a designated location, STEP 576, (for example, at the memory address in register $R_2$). The function then increments the memory address (register $R_2$) by N, and decrements the number of bytes remaining to be stored (register ($R_2+1$) by N in STEPS 578 and 580, respectively, and continues with INQUIRY 582.

At INQUIRY 582, the function determines whether a model-dependent amount of processing has occurred. If a model-dependent timeout has not occurred, then processing continues at STEP 556. If a model-dependent timeout has occurred, an indication of partial completion is set in STEP 584 (for example, the condition code is set to three), and the instruction completes.

According to one or more aspects, either or both raw or conditioned data can be produced; raw and/or conditioned data of a program-specified length can be requested; a condition code indicates whether all of the requested results have been stored; and/or a separate function indicates the ratio of raw-to-conditioned data.

Further details relating to processing an instruction (e.g., an architected machine instruction) configured to perform a plurality of functions are described with reference to FIGS. 6A-6B.

Figure 6A:
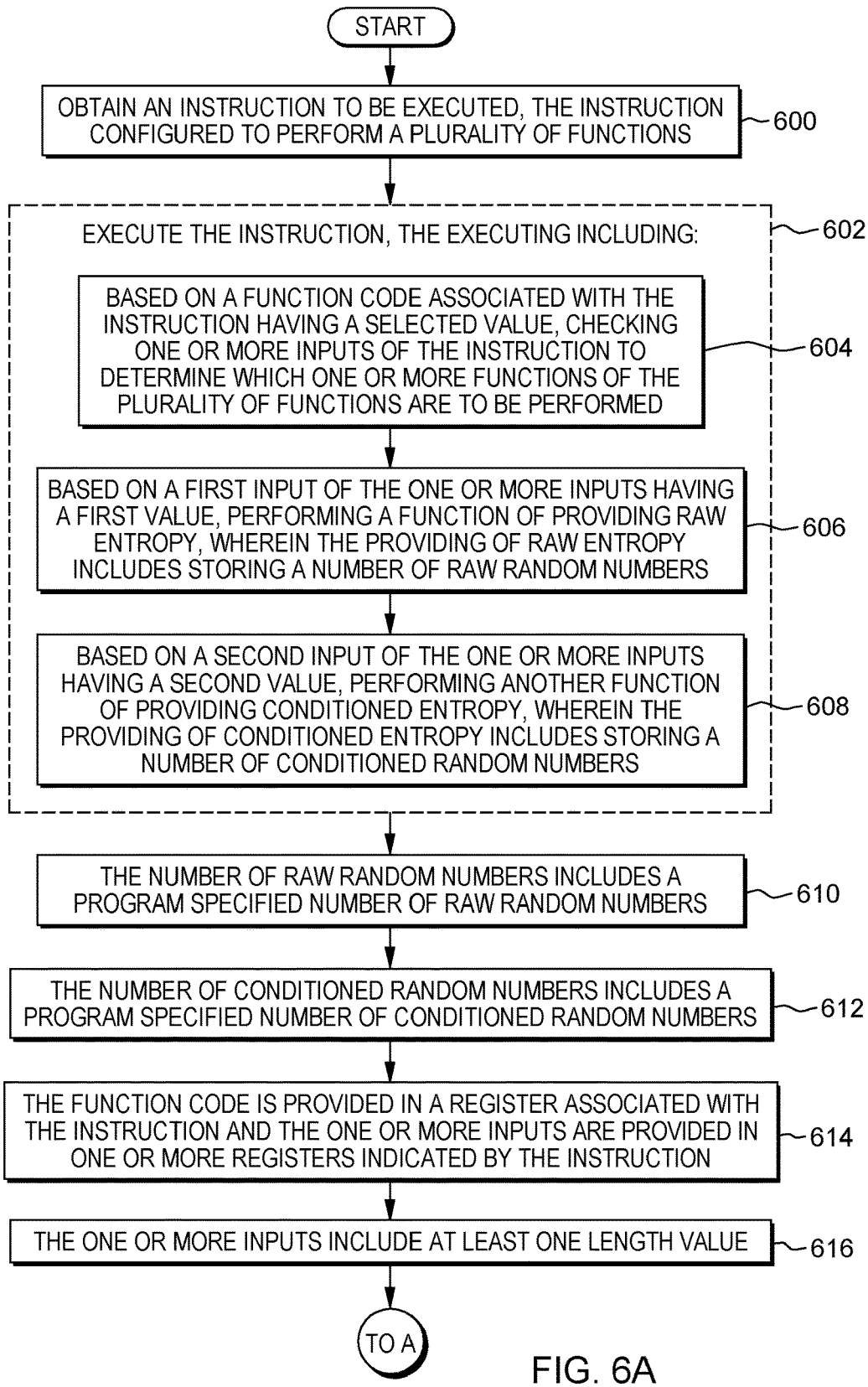
FIGS. 6A-6B depict one example of processing associated with executing an instruction configured to perform a plurality of functions, in accordance with an aspect of the present invention.

Referring initially to FIG. 6A, an instruction configured to perform a plurality of functions is obtained by a processor, STEP 600. Execution of the machine instruction then proceeds, STEP 602. The executing includes, for instance, based on a function code associated with the instruction having a selected value, checking one or more inputs of the instruction to determine which one or more functions of the plurality of functions are to be performed, STEP 604. Further, based on a first input of the one or more inputs having a first value, performing a function of providing raw entropy, wherein the providing of raw entropy includes storing a number of raw random numbers, STEP 606, and based on a second input of the one or more inputs having a second value, performing another function of providing conditioned entropy, wherein the providing of conditioned entropy includes storing a number of conditioned random numbers, STEP 608.

In one embodiment, the number of raw random numbers includes a program specified number of raw random numbers 610, and the number of conditioned random numbers includes a program specified number of conditioned random numbers 612.

Moreover, in one example, the function code is provided in a register associated with the instruction and the one or more inputs are provided in one or more registers indicated by the instruction 614. Additionally, the one or more inputs include at least one length value 616.

Figure 6B:
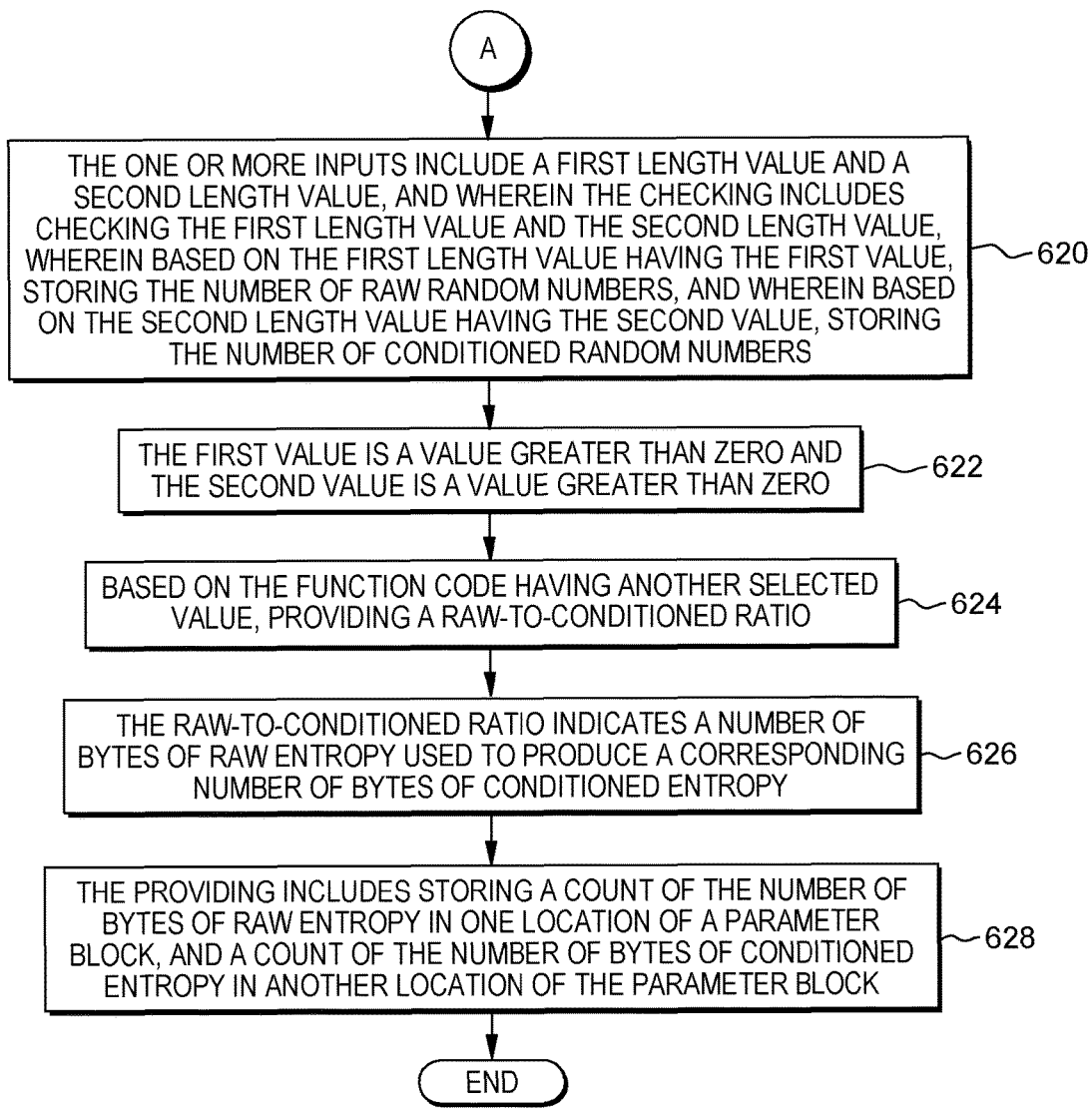

In one example, the one or more inputs include a first length value and a second length value, and wherein the checking includes checking the first length value and the second length value, wherein based on the first length value having the first value, storing the number of raw random numbers, and wherein based on the second length value having the second value, storing the number of conditioned random numbers, STEP 620 (FIG. 6B). As examples, the first value is a value greater than zero and the second value is a value greater than zero 622.

In a further embodiment, based on the function code having another selected value, a raw-to-conditioned ratio is provided, STEP 624. The raw-to-conditioned ratio indicates, e.g., a number of bytes of raw entropy used to produce a corresponding number of bytes of conditioned entropy 626.

In one embodiment, the providing includes storing a count of the number of bytes of raw entropy in one location of a parameter block, and a count of the number of bytes of conditioned entropy in another location of the parameter block, STEP 628.

Aspects of the invention are inextricably tied to computer technology, improving processing within a computing environment, including but not limited to, processing associated with security, such as data encryption, etc.

Generation of true random numbers may be more consuming of CPU resources than generating pseudorandom numbers. Therefore, to avoid exceedingly long instruction execution, the instruction may complete by indicating that only a portion of the requested result has been produced. In this case, the instruction completes by incrementing the registers containing addresses by the number of bytes stored, decrementing the registers containing lengths by the same amount, and setting an indicative condition code (e.g., CC3). When all requested TRNG output has been produced, the instruction completes by updating the address and length registers to indicate its progress, and setting another indicative condition code (e.g., CC0).

One usage is for an application program to periodically use the TRNG function to generate conditioned output, and then use the conditioned result to initially seed pseudorandom number generation for some number of iterations. Thus, for this usage, conditioned output is the only result needed. However, for statistical verification of the TRNG results, it is useful to have both the raw and conditioned entropy, thus the instruction provides both. The TRNG function of the instruction produces both raw and conditioned entropy. The program specifies how many bytes of raw entropy to be produced (if any); and the program specifies how many bytes of conditioned entropy to be produced (if any.) The TRNG query raw-to-conditioned ratio function produces a ratio indicating X bytes of raw entropy are used to produce Y bytes of conditioned entropy.

Although in the above examples, certain information, such as function codes and/or other inputs are indicated as being provided in registers, in other examples, they may be provided in other locations, such as memory locations, etc. Further, the raw-to-conditioned ratio may be returned in a location other than the parameter block, such as in registers or other memory locations. Many other such variations are possible.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing in a computing environment, the computer program product comprising:
    a non-transitory computer readable storage medium readable by a processing circuit and storing instructions for execution by the processing circuit for performing a method comprising:
        obtaining an instruction to be executed, the instruction configured to perform a plurality of functions and the instruction including at least one input; and
        executing the instruction, the executing comprising:
            based on a function code having a selected value, the function code being associated with the instruction, checking one or more inputs of the at least one input to determine which one or more functions of the plurality of functions are to be performed;
            based on a first input of the one or more inputs having a first value, performing a function of providing raw entropy, wherein the providing of raw entropy includes storing a number of raw random numbers; and
            based on a second input of the one or more inputs having a second value, performing another function of providing conditioned entropy, wherein the providing of conditioned entropy includes storing a number of conditioned random numbers.

2. The computer program product of claim 1, wherein the number of raw random numbers comprises a program-specified number of raw random numbers.

3. The computer program product of claim 1, wherein the number of conditioned random numbers comprises a program-specified number of conditioned random numbers.

4. The computer program product of claim 1, wherein the function code is provided in a register associated with the instruction, and the one or more inputs are provided in one or more registers indicated by the instruction.

5. The computer program product of claim 1, wherein the one or more inputs comprise at least one length value.

6. The computer program product of claim 1, wherein the one or more inputs comprise a first length value and a second length value, and wherein the checking comprises checking the first length value and the second length value, wherein based on the first length value having the first value, storing the number of raw random numbers, and wherein based on the second length value having the second value, storing the number of conditioned random numbers.

7. The computer program product of claim 6, wherein the first value is a value greater than zero and the second value is a value greater than zero.

8. The computer program product of claim 1, wherein based on the function code having another selected value, providing a raw-to-conditioned ratio.

9. The computer program product of claim 8, wherein the raw-to-conditioned ratio indicates a number of bytes of raw entropy used to produce a corresponding number of bytes of conditioned entropy.

10. The computer program product of claim 9, wherein the providing the raw-to-conditioned ratio comprises storing a count of the number of bytes of raw entropy in one location of a parameter block, and a count of the number of bytes of conditioned entropy in another location of the parameter block.

11. A computer system for facilitating processing in a computing environment, the computer system comprising:
a memory; and
a processor in communication with the memory, wherein the computer system is configured to perform a method, said method comprising:
obtaining an instruction to be executed, the instruction configured to perform a plurality of functions and the instruction including at least one input; and
executing the instruction, the executing comprising:
based on a function code having a selected value, the function code being associated with the instruction, checking one or more inputs of the at least one input to determine which one or more functions of the plurality of functions are to be performed;
based on a first input of the one or more inputs having a first value, performing a function of providing raw entropy, wherein the providing of raw entropy includes storing a number of raw random numbers; and
based on a second input of the one or more inputs having a second value, performing another function of providing conditioned entropy, wherein the providing of conditioned entropy includes storing a number of conditioned random numbers.

12. The computer system of claim 11, wherein the number of raw random numbers comprises a program-specified number of raw random numbers, and wherein the number of conditioned random numbers comprises a program-specified number of conditioned random numbers.

13. The computer system of claim 11, wherein the function code is provided in a register associated with the instruction, and the one or more inputs are provided in one or more registers indicated by the instruction.

14. The computer system of claim 11, wherein the one or more inputs comprise a first length value and a second length value, and wherein the checking comprises checking the first length value and the second length value, wherein based on the first length value having the first value, storing the number of raw random numbers, and wherein based on the second length value having the second value, storing the number of conditioned random numbers.

15. The computer system of claim 11, wherein based on the function code having another selected value, providing a raw-to-conditioned ratio, wherein the raw-to-conditioned ratio indicates a number of bytes of raw entropy used to produce a corresponding number of bytes of conditioned entropy.

16. A computer-implemented method of facilitating processing in a computing environment, the computer-implemented method comprising:
obtaining, by a processor of the computing environment, an instruction to be executed, the instruction configured to perform a plurality of functions and the instruction including at least one input; and
executing the instruction, the executing comprising:
based on a function code having a selected value, the function code being associated with the instruction, checking one or more inputs of the at least one input to determine which one or more functions of the plurality of functions are to be performed;
based on a first input of the one or more inputs having a first value, performing a function of providing raw entropy, wherein the providing of raw entropy includes storing a number of raw random numbers; and
based on a second input of the one or more inputs having a second value, performing another function of providing conditioned entropy, wherein the providing of conditioned entropy includes storing a number of conditioned random numbers.

17. The computer-implemented method of claim 16, wherein the number of raw random numbers comprises a program-specified number of raw random numbers, and wherein the number of conditioned random numbers comprises a program-specified number of conditioned random numbers.

18. The computer-implemented method of claim 16, wherein the function code is provided in a register associated with the instruction, and the one or more inputs are provided in one or more registers indicated by the instruction.

19. The computer-implemented method of claim 16, wherein the one or more inputs comprise a first length value and a second length value, and wherein the checking comprises checking the first length value and the second length value, wherein based on the first length value having the first value, storing the number of raw random numbers, and wherein based on the second length value having the second value, storing the number of conditioned random numbers.

20. The computer-implemented method of claim 16, wherein based on the function code having another selected value, providing a raw-to-conditioned ratio, wherein the raw-to-conditioned ratio indicates a number of bytes of raw entropy used to produce a corresponding number of bytes of conditioned entropy.

* * * * *